June 13, 1950 G. E. MUELLER 2,511,120

BALANCED ELECTRONIC TRANSLATING SYSTEM

Filed June 12, 1948

INVENTOR
G. E. MUELLER
BY H. A. Burgess
ATTORNEY

Patented June 13, 1950 2,511,120

UNITED STATES PATENT OFFICE 2,511,120

BALANCED ELECTRONIC TRANSLATING SYSTEM

George E. Mueller, Columbus, Ohio, assignor to Bell Telephone Laboratories, Incorporated, New York, N. Y., a corporation of New York Application June 12, 1948, Serial No. 32,684

9 Claims. (Cl. 332—7)

The present invention relates to a balanced modulator or amplifier space discharge system, using velocity modulation.

An object of the invention is a balanced or push-pull velocity modulation system in which velocity modulation components which are not desired in the final output are made to oppose similar components in another part of the system to reduce their magnitudes.

In the embodiment of the invention to be disclosed herein an electron beam is formed in the main stem of a Y-shaped tube and is divided into two parts near the branching point so that one-half of the beam traverses one branch of the Y and the other half traverses the other branch. Each part of the divided beam is separately velocity-modulated in respectively opposite phase by an input signal or other wave after the manner of a push-pull amplifier or of a carrier suppression modulator. A drift space is provided in each branch following the modulating point and at the far ends of the drift spaces are wave energy abstracting devices differentially coupled to a common output circuit. Provision is made in the case of a modulator for velocity-modulating the main stream, prior to its division into two parts, at a carrier frequency. Carrier-suppressed modulated waves are obtained at the output suitable for transmission or other uses.

If noise components are present in the main stream such as arise from variations in the total cathode emission, including the velocity-variation equivalent of shot noise, the balanced construction offers a possibility of reducing these to the extent to which these components divide equally between the two streams, in the same phase in both streams.

Figure 1:
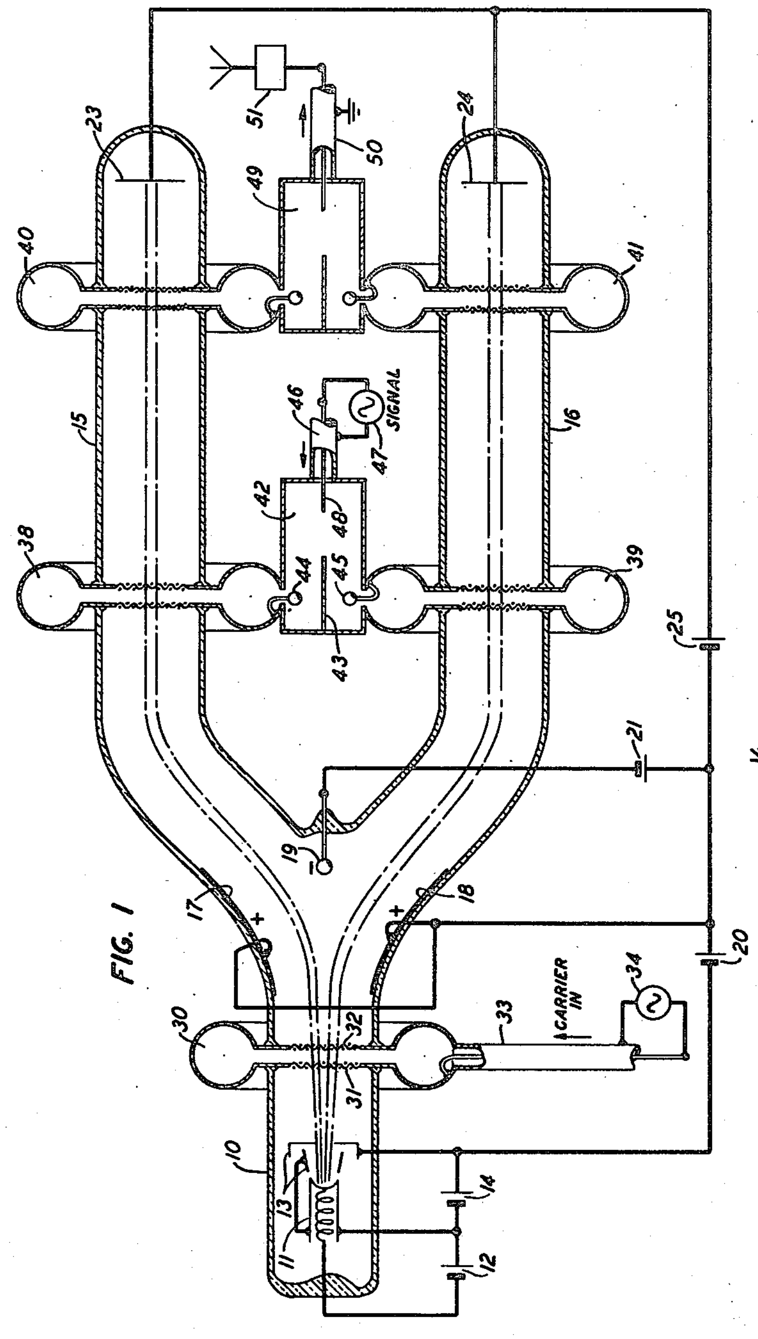
Figure 2:
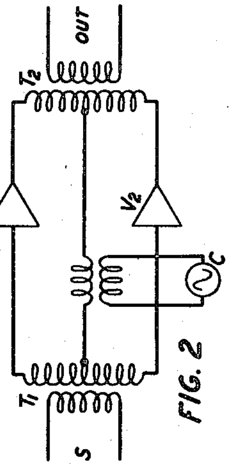

The nature and objects of the invention will be more fully understood from the following detailed description of the embodiment illustrated in the drawing, Fig. 1 of which is a longitudinal sectional view of a beam tube according to the invention and Fig. 2 is a circuit schematic of the low frequency analog of the Fig. 1 arrangement.

Referring to Fig. 1, the evacuated envelope which is Y-shaped, comprises a main stem portion 10 and the two branch portions 15 and 16. In the main stem portion a beam-forming means is shown comprising a cathode 11, the heater of which is supplied with heating current from battery 12, and accelerating and focussing electrodes, two of which are indicated at 13, supplied with proper voltages by connection to appropriate points in the battery 14. These various elements provide a beam of electrons which is projected toward the right in the figure.

The beam is divided into two branches or parts which are made as nearly equal to each other as practicable. The division is made by placing an electrode 19 at the center of the tube at the branching point biased negatively by the aid of battery 21 and by disposing two positively biased deflectors 17 and 18 on either side of the stream. The two halves of the beam now separated from each other pass along the respective tube branches 15 and 16 and are collected at the output electrodes 23 and 24, respectively, these latter being connected to the positive pole of the divided battery 14, 20, and 25.

A resonant cavity 30 with spaced perforated walls 31, 32, is provided in the main portion of the tube for velocity modulating the main stream before it is divided. A source of carrier waves 34 of suitably high frequency fed into the cavity 30 by way of coaxial line 33 may be used for this purpose. Further velocity modulating means are shown in the two resonant cavities 38 and 39 coupled into the two stream branches. Velocity modulations in opposite phase take place in these two resonators in accordance with signal waves from a source indicated at 47. The signal is fed in through a phase-splitting or phase-inverting chamber 42 which is coupled to the signal source 47 by way of coaxial line 46 including the probe 48 projecting into the chamber 42. A median septum 43 divides a portion of the chamber 42 into two equal parts in which are located the respective probes 44 and 45 for feeding signal energy to the cavities 38 and 39 respectively in phase opposition to each other.

The wave generated by the probe 48 within the wave guide 42 will be symmetrical in the sense that the fields at the probes 44 and 45 will be in phase and simultaneously directed either toward the partition 43 or away from it. Therefore the currents flowing into the cavities 38 and 39 will also be in phase. The direction of the field induced inside either of these cavities will depend not only upon the instantaneous direction of flow of current in the probe wire, but also upon the orientation of the loop in the cavity. Thus, with the loops oriented in opposite directions as shown, the excitation of the two cavities will be out of phase, and when the field in cavity 38 is directed toward the right, the field in cavity 39 will be directed to the left.

A drift space is left in each branch 15, 16 of the tube to the right of the cavities 38, 39 and beyond this drift space is a second pair of resonant cavities 40, 41 coupled to the streams for abstracting wave energy therefrom. The wave energy is taken out of the cavities 40 and 41 by a pair of probes located in the opposite sides of a phase inverter 49 which may be exactly similar to 42 and which has a load coupling 50 at the opposite end. Thus the cavities 40 and 41 are connected in push-pull to the load circuit 50. In the case of a modulator the load may, by way of example, be a radio transmitter 51.

In the operation of the device as a carrier suppression modulator, the carrier waves from source 34 produce velocity modulations in the main stream by means of the resonant cavity 30. Assuming the stream is divided into two equal parts of the branch point, similar and equal bunching of electrons in like phase will take place as the two portions of the stream drift toward the right down the two tube branches 15, 16. These modulations have no effect on the signal input circuit since this is balanced with respect to the two cavities 38, 39. Signal modulations are, however, added to the carrier frequency modulations in the two streams by the cavities 38, 39. Sum and difference products result and drift toward the right in the two streams where bunching is allowed to take place. The modulations, it will be recalled, are in opposite phase in the two streams in branches 15, 16.

The oppositely phased modulated wave components picked up in the cavities 40 and 41 are added in phase in the common output circuit 50 but the unmodulated carrier component is suppressed or balanced out since it appears in like phase in the cavities 40, 41.

When the device is used as a push-pull amplifier instead of a modulator the cavity 30 is omitted or disabled. The operation is otherwise the same as above described, there being in this case no carrier wave component to be considered. The signal is amplified in the two branches 15 and 16 in opposite phase by velocity modulation and the amplified signal is picked off at 40 and 41 and applied in cumulative manner to the load circuit.

In this case the load circuit may be the radio transmitter 51 if the signal is a radio signal or it may be any other suitable load.

In the same way that the modulations purposely introduced by cavity 30 are balanced out of the output circuit, other velocity-variation products that have like phase in the two streams tend to cancel each other in the common load due to its differential coupling to the two streams. Thus, noise or other variations that may occur in the main stream of such nature that these components divide between the two streams in like phase will be reduced in level in the output, whether the device be used as a modulator or as a push-pull amplifier.

For the purpose of bringing out some of the characteristics of the Fig. 1 device in simple manner, the low frequency analog has been included as Fig. 2. This represents the conventional balanced or carrier-suppression modulator, the two modulator tubes being indicated at $V_1$ and $V_2$, the carrier wave source at C and the signal input at S. If the carrier source C is omitted and proper adjustments made in the circuit it reduces to the well-known push-pull amplifier.

It will be noted that the carrier wave is balanced out in both the input circuit and the output circuit due to the differential windings of the input and output transformers $T_1$ and $T_2$. Second order distortion or noise products tend to cancel in the output or load. So also do other components of whatever origin, such as noise that may be present in the two sides of the circuit in like phase. These same effects are present in the Fig. 1 device.

The invention is not to be construed as limited to the details of the disclosed structure but is capable of embodiment in other forms within the scope of the claims.

What is claimed is:

1. A push-pull velocity-modulation system comprising two resonator velocity-modulation devices, means to apply modulating variations in opposite phase to said devices to produce oppositely phased velocity-modulations of the electron streams in the respective devices, two members for abstracting amplified variations from said streams and a load circuit differentially coupled to said two members.

2. A balanced velocity-modulation system comprising two devices each having an electron stream therein, a first and a second cavity resonator situated along the stream in each device, a signal input circuit coupled in reverse phase to the two first resonators and a load circuit differentially coupled to the two second resonators.

3. A system according to claim 2 in which further means are provided for imposing velocity modulations on both streams in like phase at a frequency that is high in comparison with the signal frequencies.

4. A balanced velocity-modulation system comprising two velocity-modulation devices, means to provide an electron stream in each device, means to velocity-modulate both streams in phase at a high frequency, means in each device to apply velocity modulation to the respective stream at signal frequency, in respectively opposite phase, means to abstract modulated side band components from both modulated streams and an output load coupled in push-pull relation to said abstracting means.

5. An electron space discharge comprising a Y-shaped path for the electrons, beam forming means in the stem of said Y-shaped path and means to divide the beam into two nominally equal parts in the two path branches of said Y-shaped path; a velocity-modulating member, a drift space and a wave abstracting member disposed in that order in each path branch, an input circuit differentially coupled to the two velocity modulating members, and an output circuit differentially coupled to the two wave abstracting members.

6. A device according to claim 5 including a velocity-modulating member in the main stem for modulating the beam ahead to its point of division.

7. A device according to claim 5 in which a source of signal waves to be transmitted by carrier wave transmission is coupled to said input circuit, a carrier wave transmission circuit is coupled to said output circuit and means are provided for velocity-modulating both parts of the divided beam in like phase at the carrier frequency.

8. An electronic signal translating device comprising means for producing a beam of electrons along a path within an evacuated envelope, means at a point along the said path for dividing the said beam longitudinally into two parts whereby it becomes two separate beams along two separate paths, means disposed along each of said two separate paths for impressing velocity variations in accord with a signal input upon each of the said two separate electron beams in substantially opposite phase relation, means disposed farther along on each of the said two separate paths for deriving signal energy from each of the said two separate electron beams and means for combining cumulatively the said signal energy derived from the two separate beams.

9. A device according to claim 8 including means for velocity-modulating the main beam ahead of said dividing point, at a carrier frequency.

GEORGE E. MUELLER.

REFERENCES CITED

The following references are of record in the file of this patent:

UNITED STATES PATENTS

| Number | Name | Date |
|---|---|---|
| 1,920,863 | Hopkins | Aug. 1, 1933 |
| 2,290,587 | Goldstine | July 21, 1942 |

Certificate of Correction

Patent No. 2,511,120 June 13, 1950

GEORGE E. MUELLER

It is hereby certified that error appears in the printed specification of the above numbered patent requiring correction as follows:

Column 4, line 13, strike out "resonator" and insert the same after "two" in line 17, same column; line 45, after "discharge" insert *device*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*